(12) United States Patent
Shimizu

(10) Patent No.: US 6,179,027 B1
(45) Date of Patent: Jan. 30, 2001

(54) AGRICULTURAL PNEUMATIC TIRES HAVING DIRECTIONAL LUGS

(75) Inventor: Nobuo Shimizu, Kawagoe (JP)

(73) Assignee: Bridgestone Corporation, Tokyo (JP)

( * ) Notice: Under 35 U.S.C. 154(b), the term of this patent shall be extended for 0 days.

(21) Appl. No.: 09/150,294

(22) Filed: Sep. 9, 1998

(30) Foreign Application Priority Data

Sep. 17, 1997 (JP) .................................................. 9-251734

(51) Int. Cl.[7] ......................... B60C 11/11; B60C 107/02; B60C 121/00
(52) U.S. Cl. ................................. 152/209.12; 152/209.24
(58) Field of Search ...................... 152/209.12, 209.13, 152/209.15, 209.18, 209.28, 209.24

(56) References Cited

U.S. PATENT DOCUMENTS

| | | | |
|---|---|---|---|
| 3,587,703 | * 6/1971 | Hanvs | 152/209.12 |
| 4,131,148 | * 12/1978 | Bertazzoli et al. | 152/209.12 |
| 4,186,788 | * 2/1980 | Pommier | 152/209.12 |
| 5,002,110 | 3/1991 | Tsurunaga et al. | |
| 5,010,935 | 4/1991 | Bonko et al. | |
| 5,479,973 | 1/1996 | Ikeda | |
| 5,733,394 | * 3/1998 | Bavs et al. | 152/209 B |

FOREIGN PATENT DOCUMENTS

| | | |
|---|---|---|
| 1 098 386 | 1/1961 | (DE) . |
| 0 126 476 A2 | 11/1984 | (EP) . |
| 0 552 664 A1 | 7/1993 | (EP) . |
| 1195241 | 6/1970 | (GB) . |
| 6-156018 | 6/1994 | (JP) . |
| 7-32820 | 2/1995 | (JP) . |
| 7-232516 | 9/1995 | (JP) . |
| 8-34209 | 2/1996 | (JP) . |

OTHER PUBLICATIONS

European Search Report dated Nov. 25, 1998.

* cited by examiner

*Primary Examiner*—Steven D. Maki
(74) *Attorney, Agent, or Firm*—Sughrue, Mion, Zinn, Macpeak & Seas, PLLC

(57) ABSTRACT

An agricultural pneumatic tire comprises a tread provided with many lugs extending at a given inclination angle from a central portion of the tread toward both ends of the tread and alternately arranged right and left with respect to an equatorial plane at given intervals in a circumferential direction of the tire, in which a side wall at a stepping-in side of the lug consists of a flat face slanted at a given angle with respect to a face perpendicular to the outer surface of the lug over a given distance from the outer surface and a bored face extending toward a root of the lug, and a side wall at a kicking-out side of the lug is a flat face slanted at a given angle with respect to the face perpendicular to the outer surface of the lug, and a ratio of circumferentially overlap component of the lug to circumferential length component is within a given range.

1 Claim, 1 Drawing Sheet

FIG_1
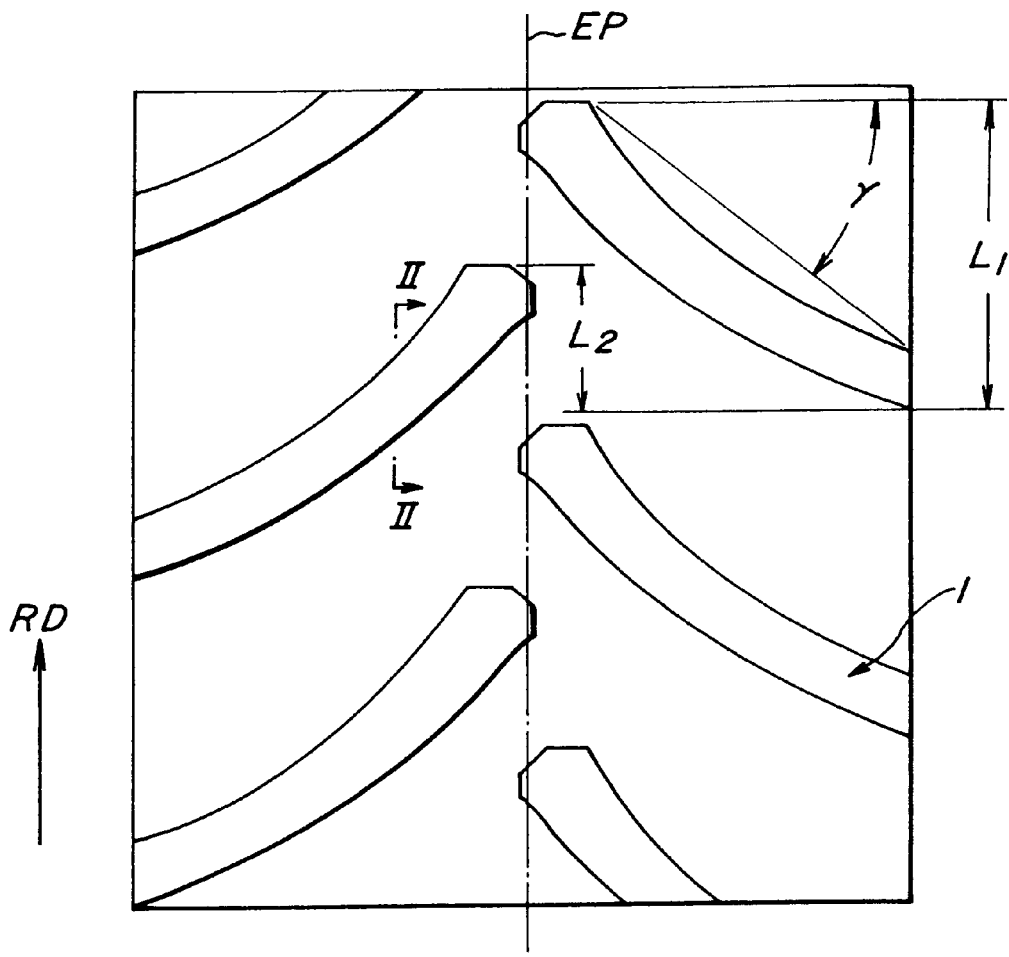
FIG_2
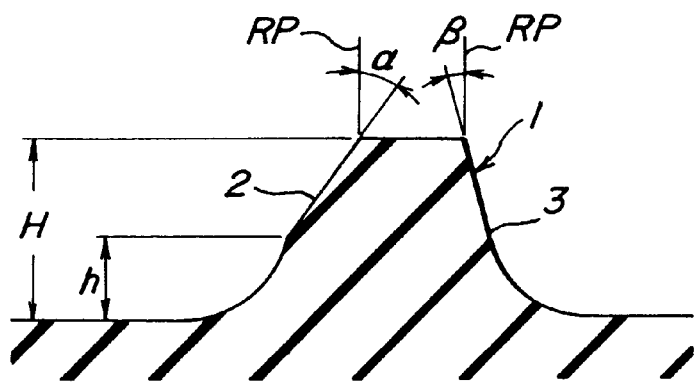

AGRICULTURAL PNEUMATIC TIRES HAVING DIRECTIONAL LUGS

BACKGROUND OF THE INVENTION

1. Field of the Invention

This invention relates to a pneumatic tire, and more particularly to an agricultural pneumatic tire comprising a tread provided with many directional slant lugs extending from a central portion of the tread toward both ends of the tread in a direction inclined with respect to a circumferential direction of the tire and alternately arranged right and left with respect to an equatorial plane of the tire at given intervals in the circumferential direction of the tire.

2. Description of Related Art

There have hitherto been proposed and practiced many agricultural pneumatic tires each comprising a tread provided with many directional slant lugs extending from a central portion of the tread toward both ends of the tread in a direction inclined with respect to a circumferential direction of the tire and alternately arranged right and left with respect to an equatorial plane of the tire at given intervals in the circumferential direction of the tire in order to ensure running performances such as traction performance, running performance and the like when the tire is run on muddy road or soft road.

Throughout the specification, the term "directional slant lugs" means lugs obliquely extending with respect to the circumferential direction and forming so-called directional tread pattern designating a rotating direction (forward running direction) RD when the tire is mounted onto a vehicle that an obliquely extended portion of the lug located at a side near to the equatorial plane first contacts with ground and the lug portion located far from the equatorial plane contacts with ground later, and a front side of the lug first contacting with ground in the forward running direction of the tire is "stepping-in side of the lug" and a rear side of the lug later contacting with ground in the forward running direction of the tire is "kicking-out side of the lug".

In such an agricultural pneumatic tire, the traction performance and mud splashing property are required as an important performance when the tire is run on muddy road or soft road. In order to decrease mud clogging on the muddy road, it is effective to widen a circumferential interval between the lugs arranged in the tread, but as the interval between the lugs becomes wider, ride comfortability against vibrations when the tire is run on general road are undesirably degraded.

On the other hand, as a lug forming angle or an angle of the lug inclined with respect to a direction parallel to an axial direction of the tire becomes small, the traction component becomes large, but the fluidity of mud between the lugs becomes small and the mud clogging is liable to be caused.

SUMMARY OF THE INVENTION

Under the above situation, it is an object of the invention to provide an agricultural pneumatic tire having excellent traction performance and mud splashing property in the running on muddy road or soft road and an excellent ride comfortability against vibrations in the running on general road.

According to the invention, there is the provision of an agricultural pneumatic tire comprising a tread provided with many directional slant lugs extending from a central portion of the tread toward both ends of the tread in a direction inclined with respect to a circumferential direction of the tire and alternately arranged right and left with respect to an equatorial plane of the tire at given intervals in the circumferential direction of the tire, wherein (1) said lugs are directional slant lugs forming so-called directional tread pattern designating a rotating direction (forward running direction) RD when the tire is mounted onto a vehicle that an obliquely extended portion of the lug located at a side near to the equatorial plane first contacts with ground and the lug portion located far from the equatorial plane contacts with ground later; (2) a side wall at a stepping-in side of the lug consists of a flat face slanted at an angle $\alpha$ of 30–45° with respect to a face inclusive of a rotating axis of the tire in a region ranging from an outer surface of the lug to a position of a height h corresponding to 45–75% of a lug height H viewed at circumferential section perpendicular to the surface of the tread, and a bored face formed in a region ranging from an end of the flat face toward a root of the lug; (3) a side wall at a kicking-out side of the lug is a flat face slanted at an angle $\beta$ of 0–22° with respect to a face inclusive of a rotating axis of the tire viewed at circumferential section perpendicular to the surface of the tread; (4) a lug forming angle $\gamma$ defined by an angle of a straight line connecting an end at the stepping-in side of the lug located near to a central portion of the tread to an end at the stepping-in side of the lug located near to each end of the tread with respect to a direction parallel to an axial direction of the tire is 30–40°; and (5) a ratio of circumferentially overlap component L2 of the lugs arranged right and left with respect to an equatorial plane of the tire to circumferential length component L1 of the lug is 30–60%.

In general, as the lug forming angle $\gamma$ defined by an angle of a straight line connecting an end at the stepping-in side of the lug located near to a central portion of the tread to an end at the stepping-in side of the lug located near to each end of the tread with respect to a direction parallel to an axial direction of the tire becomes small, the traction component becomes large, but the fluidity of mud between the lugs is decreased and hence the mud clogging is apt to be caused. On the other hand, as the lug forming angle $\gamma$ becomes large, mud is easily fluidized between the lugs and the mud clogging is favorably prevented, but the distance from the end at the stepping-in side of the lug located near to the central portion of the tread to the end at the stepping-in side of the lug located near to each end of the tread or the lug length becomes long, so that it can not necessarily be said that the increase of the lug forming angle $\gamma$ is favorable in the prevention of the mud clogging.

The agricultural pneumatic tire according to the invention has the above construction, particularly a feature that the lug forming angle $\gamma$ defined by an angle of a straight line connecting an end at the stepping-in side of the lug located near to a central portion of the tread to an end at the stepping-in side of the lug located near to each end of the tread with respect to a direction parallel to an axial direction of the tire is 30–40°, so that the fluidity of mud between the lugs is easy and the mud clogging hardly occurs and the excellent traction performance is developed while matching with various soil conditions.

In the agricultural pneumatic tire comprising a tread provided with many lugs as mentioned above, when the tire is run forward on soil, the side wall of the lug at the stepping-in side enters into the soil and is subjected to reaction force from the soil to create traction force in the forward running direction. The magnification of the reaction force is determined by an angle of the side wall when the lug enters into the soil, while this angle differs in accordance with subsidence depth of the tire. Considering that the tilling depth is usually 20–40 cm, best results are obtained when the side wall of the lug at the stepping-in side is formed by a flat face inclined at an angle α of 30–45° with respect to a face inclusive of the rotating axis of the tire. On the other hand, when the lug gets out from the soil during the running of the tire, there may be caused the carrying of soil. In order to lessen such a carrying of soil, the side wall of the lug at the stepping-in side is formed by a flat face inclined at an angle α of 30–45° with respect to a face inclusive of the rotating axis of the tire likewise the above case.

Considering only the function when the lug enters into soil or gets out from soil, the side wall of the lug at the stepping-in side may be formed by the flat face having an inclination angle α of 30–45° over a full lug height H. In this case, the space volume between the lugs becomes small and the carrying volume of soil becomes less to degrade the tilling performance, and also there may be caused an inconvenience of contacting the inclined faces of the adjacent side walls of the lugs with each other. In order to avoid such a problem, the interval between the lugs is widened, which inversely causes the degradation of the ride comfortability against vibrations in the running on general road.

In the agricultural pneumatic tire according to the invention, the side wall at the stepping-in side of the lug is formed by a flat face slanted at the angle α of 30–45° with respect to the face inclusive of the rotating axis of the tire in a region ranging from the outer surface of the lug to a position of the height h corresponding to 45–75% of the lug height H viewed at circumferential section perpendicular to the surface of the tread, whereby the traction performance is improved. And also, the bored face is formed in a region ranging from the end of the flat face having the inclination angle α toward a root of the lug, whereby the tilling performance is improved.

In the agricultural pneumatic tire according to the invention, the side wall at the kicking-out side of the lug is formed by a flat face slanted at the angle β of 0–22° with respect to the face inclusive of the rotating axis of the tire viewed at circumferential section perpendicular to the surface of the tread, whereby the traction performance is improved. When the angle β exceeds 22°, the resistance in the running on soil undesirably increases to lower the driving force, while when it is less than 0° or a minus value, the lug rigidity is small and the deformation in the running is large and hence the lug strength is insufficient and the traction performance is degraded.

In the agricultural pneumatic tire according to the invention, the ratio of circumferentially overlap component L2 of the lugs arranged right and left with respect to the equatorial plane to circumferential length component L1 of the lug is within a range of 30–60%, whereby the ride comfortability against vibrations in the running on general road is improved. When the ratio L2/L1 is less than 30%, the ride comfortability against vibrations extremely degrades, while when it exceeds 60%, it is difficult to adequately form the bored face and also top ends of the adjoining lugs located at the central portion of the tread extremely approach to each other and hence the soil clogging is apt to be caused.

BRIEF DESCRIPTION OF THE DRAWINGS

The invention will be described with reference to the accompanying drawings, wherein:

FIG. 1 is a schematically developed view of an embodiment of the tread pattern in the agricultural pneumatic tire according to the invention; and FIG. 2 is a diagrammatically section view of a lug taken along a line II—II of FIG. 1.

DESCRIPTION OF PREFERRED EMBODIMENTS

As shown in FIG. 1, an embodiment of the agricultural pneumatic tire according to the invention comprises a tread provided with many lugs 1 extending from a central portion of the tread toward both ends of the tread in a direction inclined with respect to a circumferential direction of the tire and alternately arranged right and left with respect to an equatorial plane EP of the tire at given intervals in the circumferential direction of the tire. These lugs 1 are directional slant lugs forming so-called directional tread pattern designating a rotating direction (forward running direction) RD when the tire is mounted onto a vehicle that an obliquely extended portion of the lug located at a side near to the equatorial plane EP first contacts with ground and the lug portion located far from the equatorial plane contacts with ground later.

A lug forming angle γ defined by an angle of a straight line connecting an end at the stepping-in side of the lug 1 located near to the central portion of the tread to an end at the stepping-in side of the lug located near to each end of the tread with respect to a direction parallel to an axial direction of the tire is 40°.

A ratio of circumferentially overlap component L2 of the lugs 1 arranged right and left with respect to the equatorial plane EP to circumferential length component L1 is 46%.

As shown in FIG. 2, a side wall 2 at the stepping-in side of the lug 1 is formed by a flat face slanted at an angle α of 35° with respect to a face RP inclusive of a rotating axis of the tire in a region ranging from an outer surface of the lug to a position of a height h corresponding to 60% of a lug height H viewed at circumferential section perpendicular to the surface of the tread or section parallel to the equatorial plane EP, and bored face is formed in a region ranging from an end of the flat face toward a root of the lug. A side wall 3 at the kicking-out side of the lug 1 is formed by a flat face slanted at an angle β of 15° with respect to a face RP inclusive of the rotating axis of the tire viewed at circumferential section perpendicular to the surface of the tread or section parallel to the equatorial plane EP.

An agricultural pneumatic tire of Comparative Example 1 has the same structure as in the agricultural pneumatic tire of the example except that the lug forming angle γ is 30°, and the ratio L2/L1 is 25%, and the side wall 2 at the stepping-in side of the lug 1 has an angle α of 15° without forming the bored face, and the side wall 3 at the kicking-out side of the lug 1 has an angle β of 30°.

An agricultural pneumatic tire of Comparative Example 2 has the same structure as in the agricultural pneumatic tire of the example except that the lug forming angle γ is 45°, and the ratio L2/L1 is 50%, and the side wall 2 at the stepping-in side of the lug 1 has an angle α of 15° without forming the bored face, and the side wall 3 at the kicking-out side of the lug 1 has an angle β of 30°.

Tests for evaluating the ride comfortability against vibrations, slip ratio and mud clogging are made with respect to the agricultural pneumatic tires according to the invention and Comparative Examples 1 and 2.

The ride comfortability against vibrations is evaluated by measuring an acceleration speed when the tire is run on general road at a speed of 10–30 km/h and represented by an index on the basis that the tire of Comparative example 1 is 100. The index value of the ride comfortability is 60 in the tire according to the invention and 50 in the tire of Comparative Example 2. The smaller the index value, the better the ride comfortability.

The slip ratio is evaluated by measuring a slip ratio in the self-running on a paddy field having a tilling depth of 30 cm and represented by an index on the basis that the tire of Comparative example 1 is 100. The index value of the slip ratio is 95 in the tire according to the invention and 140 in the tire of Comparative Example 2. The smaller the index value, the smaller the slipping.

The mud clogging is evaluated at three stages of large, middle and small by visually observing a state of clogging a space between the lugs with mud. As a result, the mud clogging is middle in the tire of Comparative Example 1, large in the tire of Comparative Example 2 and small in the tire according to the invention.

The evaluation results of the above tests are shown in Table 1 together with various dimensions of the agricultural pneumatic tires according to the invention and Comparative Examples 1 and 2.

TABLE 1

|  | Example | Comparative Example 1 | Comparative Example 2 |
|---|---|---|---|
| α | 35° | 16° | 15° |
| β | 15° | 30° | 30° |
| γ | 40° | 30° | 45° |
| h/H | 60% | — | — |
| L2/L1 | 46% | 25% | 50% |
| Vibration level | 60 | 100 | 50 |
| Slip ratio | 95 | 100 | 140 |
| Mud clogging | small | middle | large |

As seen from the above evaluation results, when the agricultural pneumatic tire according to the invention is compared with the tire of Comparative Example 1, the slip ratio is substantially the same, but the ride comfortability against vibrations is excellent and the mud clogging hardly occurs. On the other hand, when the tire of Comparative Example 2 is compared with the tire of Comparative Example 1, the ride comfortability against vibrations is excellent, but it is apt to easily cause the slippage and mud clogging.

What is claimed is:

1. An agricultural pneumatic tire comprising a tread provided with multiple directional slant lugs extending from a central portion of the tread toward both end portions of the tread in a direction inclined with respect to a circumferential direction of the tire and alternately arranged right and left with respect to an equatorial plane of the tire at intervals in the circumferential direction of the tire, wherein (1) said lugs are directional slant lugs defining a directional tread pattern designating a rotating direction RD when the tire is mounted onto a vehicle such that an obliquely extended portion of the lug located at a side near to the equatorial plane first contacts with ground and the lug portion located far from the equatorial plane contacts with ground later when the vehicle is moving in a forward direction;

(2) a side wall at a stepping-in side of the lug comprising a flat face slanted at an angle α of 30–45° with respect to a plane inclusive of a rotating axis of the tire in a region ranging from an outer surface of the lug to a position of a height h corresponding to 45–75% of a lug height H viewed at circumferential section perpendicular to the surface of the tread, and a bored face formed in a region ranging from an end of the flat face toward a root of the lug;

(3) a side wall at a kicking-out side of the lug comprising a flat face slanted at an angle β of 0–22° with respect to a plane inclusive of a rotating axis of the tire viewed at circumferential section perpendicular to the surface of the tread;

(4) a lug forming angle γ defined by an angle of a straight line connecting an end at the stepping-in side of the lug located near to a central portion of the tread to an end at the stepping-in side of the lug located near to each end portion of the tread with respect to a direction parallel to an axial direction of the tire is 30–40°; and (5) a ratio of circumferentially overlap component L2 of the lugs arranged right and left with respect to an equatorial plane or the tire to circumferential length component L1 of the lug is 30–60%.

* * * * *